(12) United States Patent
Riegel (10) Patent No.: US 9,207,967 B2
(45) Date of Patent: Dec. 8, 2015

(54) USING NONSPECULATIVE OPERATIONS FOR LOCK ELISION

(71) Applicant: Red Hat, Inc., Raleigh, NC (US)

(72) Inventor: Torvald Riegel, Dresden (DE)

(73) Assignee: Red Hat, Inc., Raleigh, NC (US)

( * ) Notice: Subject to any disclaimer, the term of this patent is extended or adjusted under 35 U.S.C. 154(b) by 111 days.

(21) Appl. No.: 14/148,919

(22) Filed: Jan. 7, 2014

(65) Prior Publication Data

US 2015/0193265 A1  Jul. 9, 2015

(51) Int. Cl.
*G06F 12/08* (2006.01)
*G06F 9/46* (2006.01)
*G06F 12/14* (2006.01)

(52) U.S. Cl.
CPC ............ *G06F 9/467* (2013.01); *G06F 12/0828* (2013.01); *G06F 12/1466* (2013.01); *G06F 2212/621* (2013.01)

(58) Field of Classification Search
CPC .. G06F 9/467; G06F 12/0828; G06F 12/1466
See application file for complete search history.

(56) References Cited

U.S. PATENT DOCUMENTS

| | | | |
|---|---|---|---|
| 7,206,922 B1 * | 4/2007 | Steiss ........................... 712/216 |
| 7,930,694 B2 | 4/2011 | Anderson et al. |
| 7,984,248 B2 | 7/2011 | Kottapalli et al. |
| 8,190,859 B2 | 5/2012 | Akkary et al. |
| 8,417,897 B2 | 4/2013 | Marathe et al. |
| 8,539,486 B2 | 9/2013 | Cain et al. |
| 2003/0182154 A1 * | 9/2003 | Myers et al. ....................... 705/1 |
| 2005/0021912 A1 * | 1/2005 | Ho et al. ......................... 711/137 |
| 2006/0117148 A1 * | 6/2006 | Liu et al. ........................ 711/146 |
| 2008/0134196 A1 * | 6/2008 | Madriles et al. .............. 718/106 |
| 2008/0288691 A1 * | 11/2008 | Bie et al. ....................... 710/200 |
| 2009/0119459 A1 | 5/2009 | Akkary et al. |
| 2009/0198694 A1 * | 8/2009 | Thomas ............................ 707/8 |
| 2010/0169623 A1 | 7/2010 | Dice |

FOREIGN PATENT DOCUMENTS

| | | |
|---|---|---|
| WO | WO2013115816 | 8/2013 |
| WO | WO2013115818 | 8/2013 |

OTHER PUBLICATIONS

Yehuda Afek, et al., "Pessimistic Software Lock-Elision", Tel-Aviv University, MIT and Tel-Aviv University, 15 pages.

Aditya G. Holla and Maurice Herlihy, "Lock Elision for Memcached: Power and Performance Analysis on an Embedded Platform", Computer Science Department, Brown University, Feb. 11, 2013, pp. 1-9.

(Continued)

*Primary Examiner* — Hiep Nguyen
(74) *Attorney, Agent, or Firm* — Lowenstein Sandler LLP (57) ABSTRACT

A method includes identifying a set of instructions to be executed as a transaction that is to access a section of memory, prior to executing the set of instructions as the transaction, facilitating a non-speculative access to a data cache, the data cache comprising a plurality of cache lines, each cache line comprising a lock to lock a respective portion of the memory, determining if the section of memory is available for the transaction in view of locks of the plurality of cache lines, and in response to a determination that the section of memory is not available, causing the non-speculative access to the data cache to be repeated.

20 Claims, 6 Drawing Sheets

(56) References Cited

OTHER PUBLICATIONS

Martin Pohlack and Stephan Diestelhorst, "From Lightweight Hardware Transactional Memory to Lightweight Lock Elision", Advance Micro Devices, Inc., 2011, 7 pages.

X. Wang, et al., "A Review of Hardware Transactional Memory in Multicore Processors", Information Technology Journal 8 (7): 965-970, 2009, ISSN 1812-5638.

Luke Dalessandro, et al., "Hybrid NOrec: A Case Study in the Effectiveness of Best Effort Hardware Transactional Memory", ASPLOS '11, Mar. 5-11, Newport Beach, CA, USA, 13 pages.

Ravi Rajwar and James R. Goodman, "Speculative Lock Elision: Enabling Highly Concurrent Multithreaded Execution", Proceedings of 34th Internaltion synposium on Microarchitecture (Micro), Dec. 3-5, 2001, Austin, Texas, USA, 12 pages.

Torvald Riegel, et al., "Optimizing Hybrid Transactional Memory: The Importance of Nonspeculative Operations", SPAA '11, Jun. 4-6, 2011, San Jose, California USA, Copyright 2011, 12 pages.

* cited by examiner

USING NONSPECULATIVE OPERATIONS FOR LOCK ELISION

TECHNICAL FIELD

The present disclosure relates to a computer system, and more specifically to a method and system for managing hardware transactional memory that controls access to sections of a memory in an operating environment that executes multiple threads in parallel.

BACKGROUND

Computing devices such as computers, tablet computers, and smart phones may include one or more processors that each may further include one more computing cores. To reduce processing time and fully utilize the computing power of the processors, an operating system for the computing device may concurrently execute multiple applications and multiple threads of instructions within each applications. These applications and threads may be collectively referred to as tasks for the one or more processors herein.

When tasks run concurrently, they may attempt to concurrently access data stored in a memory device. Concurrent accesses of a same memory by different tasks may create unwanted race situations. For example, after task A reads from an address pointing to a section of the memory, task B may read the same section and update the section by writing to the address pointing to the section. If, subsequent to the write by task B, task A comes back and writes to the same section, task A may run the risk of unintentionally overwriting the results of task B—which is often undesirable and unsafe.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Race situations may be mitigated by either a lock system or a transactional memory method. As discussed in the following, although the lock system may be race-proof, it places the difficult task of managing locks on application programmers and is over-conservative at the expense of execution efficiency. The transactional method, on the other hand, may generate a lot of failed transaction executions (or rollbacks) which are also undesirable. Therefore, there is a need to improve the current race-prevention methods.

Some aspects of the disclosure are directed to a method including identifying, by a scheduler of an operating system executing on a processing device, a set of instructions to be executed as a transaction that is to access a section of memory, prior to executing the set of instructions as the transaction, facilitating a non-speculative access to a data cache coupled to the processing core, the data cache comprising a plurality of cache lines, each cache line comprising a lock to lock a respective portion of the memory, determining if the section of memory is available for the transaction in view of locks of the plurality of cache lines, and in response to a determination that the section of memory is not available, causing the non-speculative access to the data cache to be repeated.

When tasks (e.g., applications, threads, etc.) run concurrently on a computing device, they may attempt to concurrently access a main memory shared by many processors or processing cores on the computing device. Concurrent accesses of the same memory or same section of the memory by different tasks may create unwanted race situations. One way to prevent these race situations is to use locks to assign a task certain exclusive rights to a record so that other tasks are prevented from freely accessing the memory. Prior to accessing a memory, a task may first check a lock assigned to the record to determine if the task is allowed to access the memory. If the memory is available for the task to access, the task may first acquire a lock to the memory to let other subsequent tasks know that the memory is locked by the task, and then the kernel may start executing the task which may safely access the memory. However, if the memory (or the needed section of the memory) is already locked by another task, the inquiring task may not start its execution.

In practice, application programmers need to write program instructions of lock management which is a burden on the application programmers to take full account of all race situations. Additionally, the lock system may not be the most efficient way to prevent race situations because the lock system may be over-conservative in race prevention.

To improve the speed of parallel executions of tasks executed on multiple processors/cores, locks may be speculatively elided, referred to as lock elision. Lock elision may purposely execute instructions that access a section of the memory without acquiring a lock, but would abort the execution in the event that a conflict access to the same section of the memory occurs. One lock elision technique uses Transactional Memory ("TM") model to implement memory section protection. Under the TM model, lock elision does not add a lock for the execution of a set of instructions that access a section of the memory. Instead, memory section protection is achieved by speculatively executing a task in a "transaction" and reading the lock status stored in the lock memory to make sure a lock to the section is not held by any other tasks throughout the execution of the transaction. However, if the reading of the lock status detects that the lock is held by another task which causes a conflict with the execution of the other task, the present task is aborted. A roll back process may be followed so that the transaction may be re-executed from a preserved checkpoint.

A transaction involves the execution of a set of instructions in a single and indivisible step. Thus, instead of trying to manage a lock to a main memory, the programmer may simply identify sets of instructions that need to be executed as transactions. For example, a programmer may simply insert markers in the source code that indicate the beginning and end of a transaction. Alternatively, the operating system may identify sections of instructions as transactions on behalf of application programmers. The execution of the set of instructions as a transaction may be taken care of by an operating system of the processing device on which the set of instructions are executed. In this way, the programmer is freed from the burden of guaranteeing the correctness and performance of the lock system. Furthermore, the section of the memory shared by multiple tasks is kept consistent even in the event of a conflict.

The TM model may have the characteristics of atomicity, consistency, and isolation. The atomicity of TM model requires transactions either commit (or complete to success) or abort. The consistency of the TM model may guarantee that each time a transaction is executed, a same set of operations are executed so that re-execution of failed transactions may not affect the final results of the instructions executed in transactions.

When no conflict is detected during the execution of instructions in a transaction, the TM system may execute multiple transactions in parallel. However, if operations in a transaction attempt to access a section of a memory that is locked by another task or being used by another transaction, a conflict may be detected by the TM system, causing the processing device to abort the present transactions and roll back the execution of the aborted transaction. Conflicts may arise when a transaction attempts to access a memory section that is locked by another task. Conflicts may also arise when the two transactions attempt to write to a same memory section (referred to as "write-write" conflict), or one transaction attempts to write to and the other attempts to read from the same memory section (referred to as "write-read" conflict). References to the memory section (such as the addresses of the memory section) may be tracked to detect conflicts between a transaction and a lock, or between transactions, that attempt to access the same memory section.

The TM system may be implemented in hardware. Hardware transactional memory (HTM) may use hardware cache to detect conflicting transactions. By using hardware, HTM may speed up executions of tasks without committing errors. The HTM may operate within a multi-task operating environment of a computer system.

Figure 1:
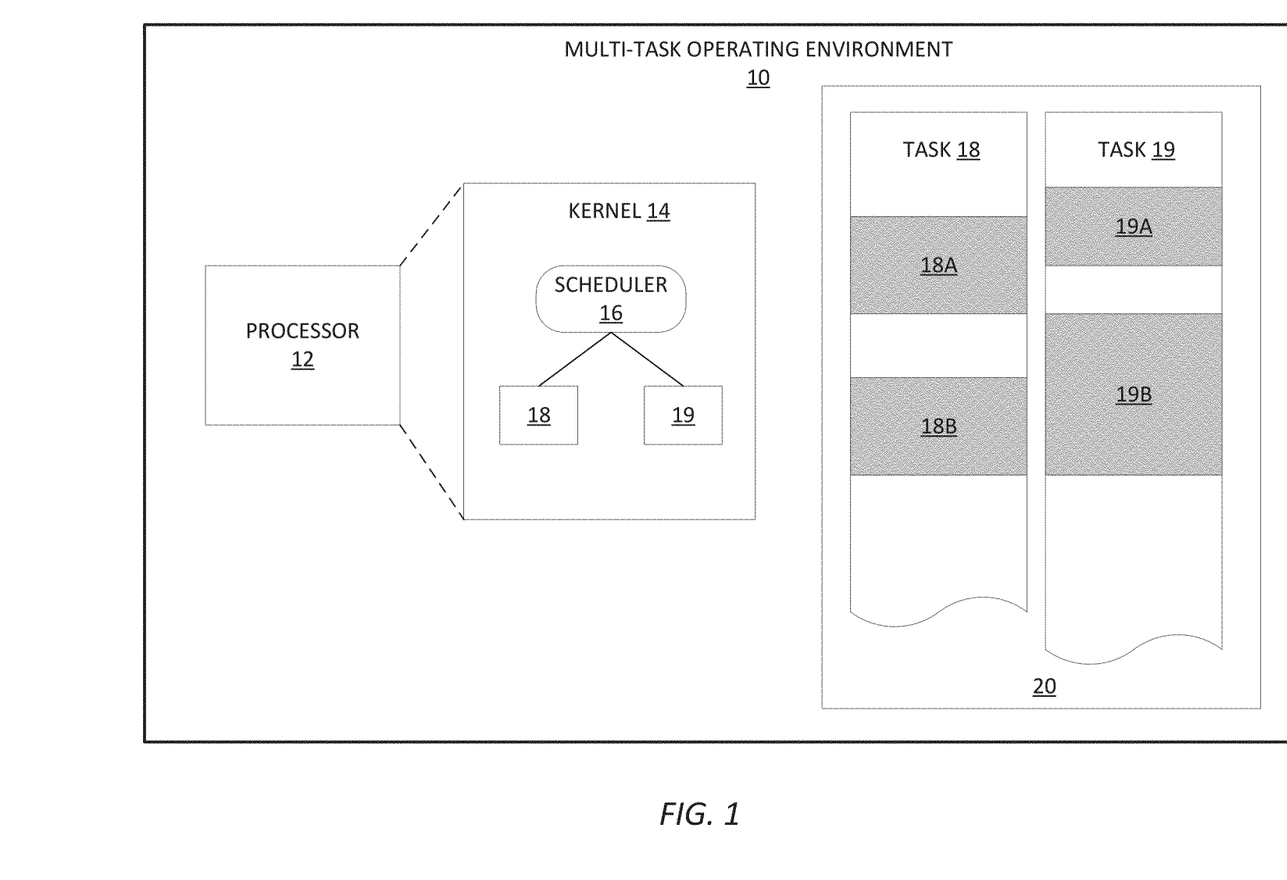
FIG. 1 illustrates a multi-task operating environment including mechanisms to execute transactions according an implementation of the disclosure.

FIG. 1 illustrates a multi-task operating environment 10 including mechanisms to execute transactions according an implementation of the disclosure. The multi-task environment 10 may manage a number of computing resources including a hardware processor 12, a memory device 20, and peripheral devices (not shown) such as monitors, printers, and network interfaces. Processor 12 may include one or more computing cores. In one implementation, the processor 12 may be a central processing unit (CPU) or a graphic processing unit (GPU), which may execute multiple streams of instructions or tasks.

The multi-task environment 10 may include a kernel 14 of an operating system for managing the multiple applications and threads to be executed on processor 12. In particular, kernel 14 may include a scheduler 16 that is to schedule the order of executions of applications and threads. Referring to FIG. 1, tasks 18, 19 may be stored on memory 20 and may include sections of instructions 18A, 18B, 19A, 19B that are marked to be executed as transactions to prevent race situations. The scheduler 16 may be responsible for scheduling the execution of these tasks 18, 19 including the transactions therein. These transactions at the turn of their executions may be executed in a hardware transactional memory system.

Figure 2:
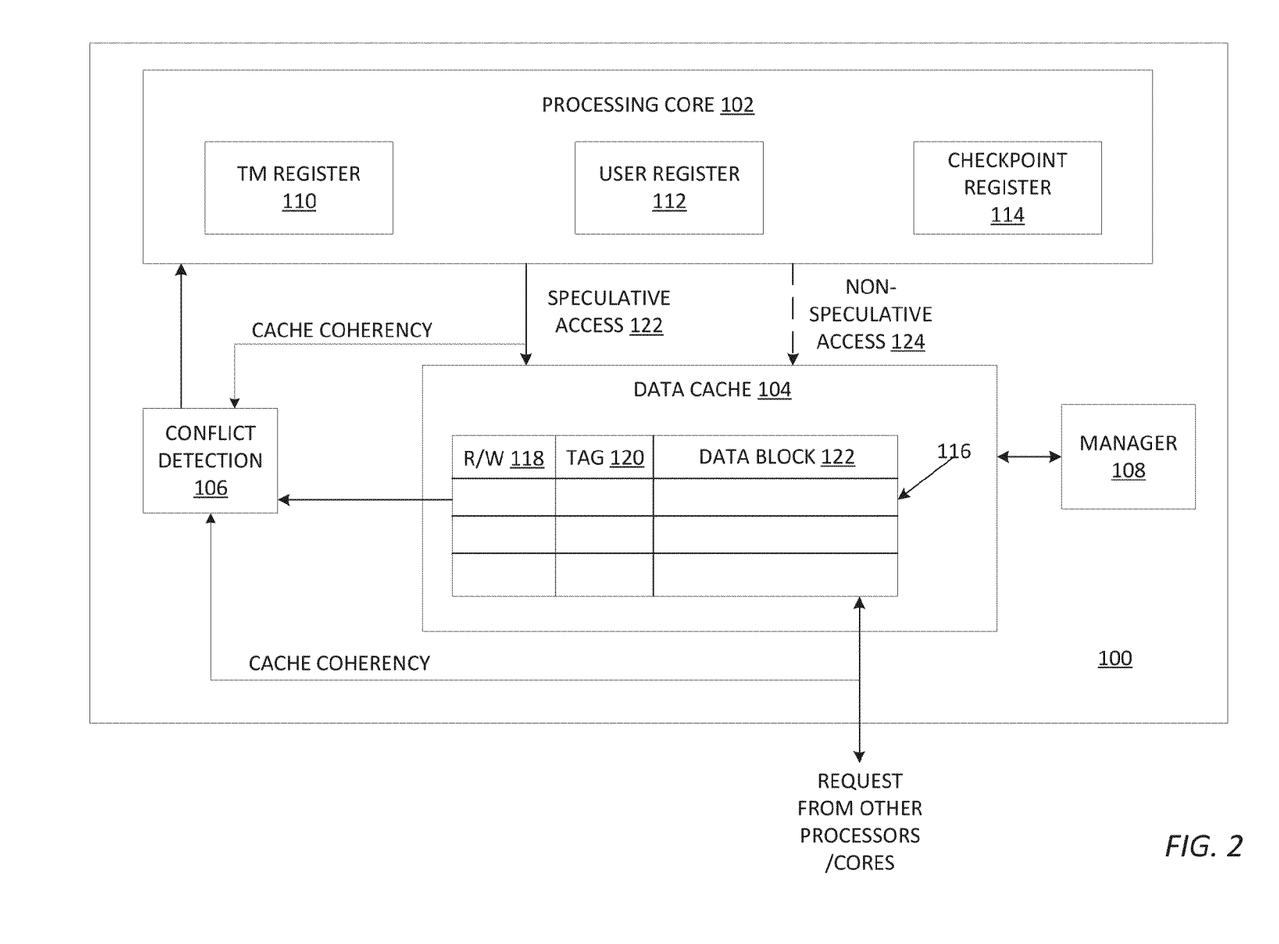
FIG. 2 illustrates circuit blocks implementing a hardware transactional memory system on a processing device according to an implementation of the disclosure.

FIG. 2 illustrates an example processing device 100 implementing a hardware transactional memory system. In one implementation, the processing device may be a computer system. The processing device 100 as shown in FIG. 2 may include a processing core 102, data cache 104, conflict detection logic 106, and a manager logic 108. Processing core 102 may further include transactional memory register 110, user register 112, and checkpoint register 114. Data cache 104 may include a number of cache lines 116 each including a tag 120 and data block 122. Additionally, each cache line may be augmented with a read/write indicator (R/W) 118, which may be one or two bit long.

In one implementation, processor core 102 may be one of many cores in a processing device 100 and may execute instructions of different threads in parallel. TM register 110, user register 112, and checkpoint register 114 may be part of level one ("L1") cache of processing core 102 that is exclusively used by processing core 102. Data cache 104 may be level two ("L2") cache that may be shared by more than one processing core or processor. Conflict detection logic 106 and manager logic 108 may be hardware circuits or functions implemented on hardware circuits for achieving HTM.

An HTM system may be achieved by TM register 110, checkpoint register 114, checkpoint detection logic 106, R/W indicator 118 of data cache 104, and manager 108, working collaboratively. Processing core 102 may store instructions to be executed in user register 112. However, to execute a set of instructions as a transaction, the HTM system may track information relating to the transaction. Processing core 102 may store transaction data such as transaction id, nesting levels of the transaction, and the addresses of a memory section which instructions in the transaction need to read from or write to. Checkpoint register 114 may store checkpoints—i.e., the contents and state of registers in processing core 102, prior to execution of a transaction. Thus, when the transaction is aborted due to detection of a conflict with a lock or another transaction, processing core 102 may roll back the transaction and restore registers (such as user register 112) back to its original contents and states based on the checkpoints stored in checkpoint register 114.

Data cache 104 may store information fetched from main memory (not shown) in the processing device 100. Since data cache 104 may be shared by many processing cores or many processors, cache lines 116 of data cache 104 may be updated by different processing cores. In each cache line 116, the data block 122 may store the data that are fetched from the main memory so that processing cores may retrieve the data from data cache 104 rather than from the main memory. Tag 120 may store the address of the main memory from which the data was retrieved. R/W indicator 118 may be used to flag whether the access by a transaction (or a task that has acquired a lock) to the memory address contained in tag 120 is a read or write access. Manager logic 108 may manage data stored in the main memory in the event of a transaction commit and/or transaction abort. In the event of transaction commit, manager logic 108 may update the data at the address stored in tag 120 and delete the cache line if needed. However, in the event of transaction abort, manager logic 108 may maintain the data at the address stored in tag 120.

Conflicts by a transaction with existing locks and transactions may be detected by conflict detection logic 106 using cache coherency protocol. In one implementation, a new lock may be acquired by a task by creating a cache line in data cache 104 in which the section of tag 120 may indicate that a section of the main memory is being locked by a task and thus cannot be accessed while the lock is in existence. Thus, data cache 104 may store a list of locks that each may lock a respective section of the main memory. Transactions that are currently-executing may also create cache lines in data cache 104 indicating the states of the currently-executing transactions. In one implementation, prior to a transaction execution, processing core 102 may issue a speculative access (including read and write accesses) instruction 122 which may create a new cache line 116 in data cache 104. The created cache line 116 for the transaction may include tag 120 storing address pointing to a section in the memory and indicating the memory section that the instructions in the transaction may need to access. The cache line 116 for the transaction may also include R/W indicator 118 indicating types of access ("Read," "Write," or "Read and Write").

Conflict detection logic 106 may use cache coherency protocol to detect conflicts for a transaction. Conflict detection logic 106 may use cache coherency protocol to compare different cache lines to determine if there is an overlapping memory address in tags 120 with the present transaction. If present transaction does not create any conflict with any lock or transaction stored in data cache 104, the processing core 102 may go ahead commit the present transaction. However, if the present transaction is in conflict with an existing lock or an existing transaction, the processing core 102 may abort the present transaction and restore registers to their original state according to the checkpoints stored in checkpoint register 114.

Although the HTM system may improve the execution speed over a lock system, a lot of transactions may be aborted by processing core 102 due to conflicts with existing locks or transactions. Since a transaction may be nested with other transactions, the abortion of the transaction causes the nested transactions being aborted as well. This creates inefficiencies in HTM systems.

One implementation of the present disclosure provides for a non-speculative access instruction to access data cache prior to execution of a transaction. The processing device 100 may implement a HTM system that includes a non-speculative access instruction 124. Compared to a speculative access instruction 122 that creates a cache line 116 in data cache 104, the non-speculative access 124 when executed does not create a cache line in data cache 104. Because the non-speculative access 124 does not create a cache line, conflict detection logic 106 does not detect the non-speculative access 124 using cache coherency protocol. Thus, even if there is a conflict for a present transaction with a lock or an existing transaction stored in cache lines 116 of data cache 104, the non-speculative access 124 by the present transaction does not cause transactions, in particular, the present transaction, to abort. Thus, the non-speculative access by a transaction may provide a free look for the transaction. In view of the results of the non-speculative access, executions of transactions according to the HTM system may be improved.

Figure 3:
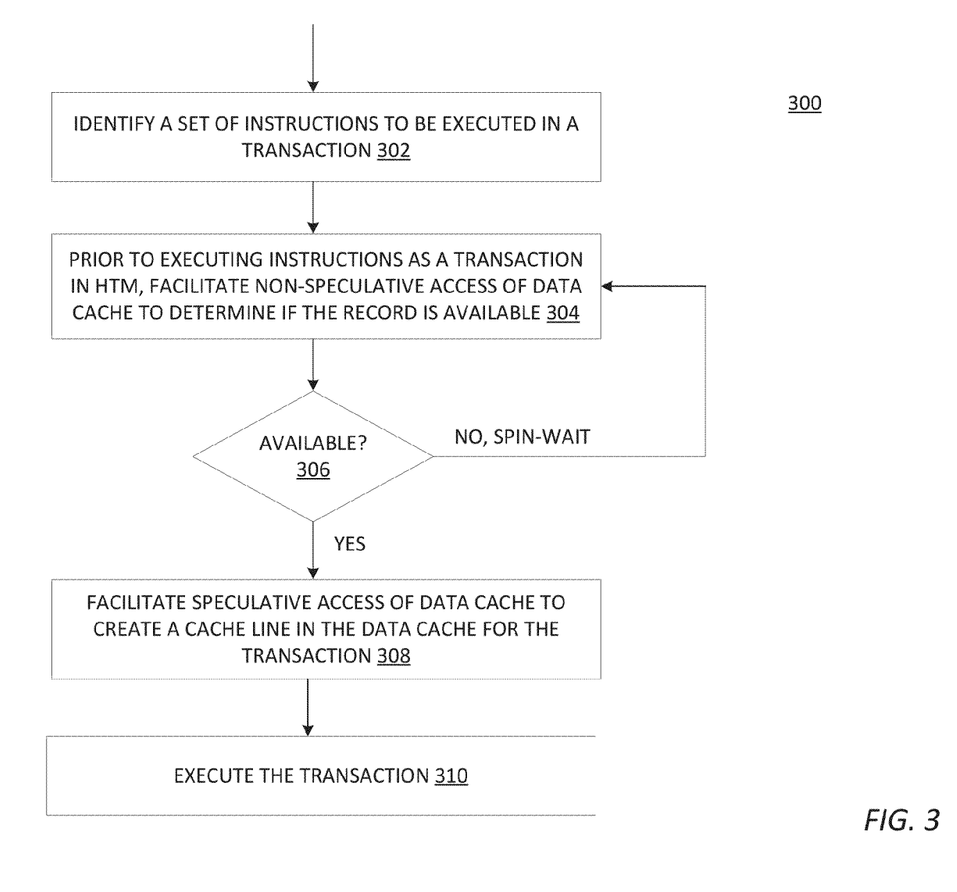
FIG. 3 shows a flow diagram illustrating a method for using non-speculative access operations in a hardware transactional memory system according to implementations of the disclosure.

FIG. 3 shows a flow diagram illustrating a method 300 for using non-speculative access operations in a hardware transactional memory system according to implementations of the disclosure. Method 300 may be performed by a processing logic that may include hardware (e.g., circuitry, dedicated logic, programmable logic, microcode, etc.), software (e.g., instructions run on a processing device to perform hardware simulation), or a combination thereof. In one example, method 300 may be performed by scheduler 16 as shown in FIG. 1.

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

At 302, the processing logic may identify a set of instructions that are marked to be executed as a transaction. A transaction may be marked by a programmer in the source code. For example, the programmer may place a transaction begin mark at the beginning of a set of instructions and a transaction end mark at the end of the set. When the program including the set of instructions is compiled by a compiler, the compiler may insert markers that are recognizable by the processing logic to identify a transaction. The transaction may need to access a certain section of a memory. The access to the memory may cause conflicts with other tasks concurrently executing.

At 304, in response to the identification of a transaction, the processing logic may facilitate the execution of a non-speculative access command on a data cache (coupled to the processing logic) whose cache lines may store locks for the memory or address data indicating memory sections being used by other transactions. The non-speculative access does not create a new cache line on the data cache for the present transaction, and thus does not cause the present transaction to abort even if there is a conflict. However, the non-speculative access may determine if the memory section that the present transaction needs to access is available to the present transaction.

At 306, the processing logic may determine that due to a conflict with existing locks and transactions, the present transaction cannot access the needed memory section, the processing logic may cause the execution of a spin-wait operation (or the performance of the non-speculative access in a loop) until the needed section is made available by lock release or commitments of concurrently-executing transactions. On the other hand, if the needed section of the main memory is available, the processing logic may proceed to cause the execution of the present transaction.

At 308, the instructions in the transaction may be placed in the HTM system for execution as a transaction. The processing logic may facilitate a speculative access of the data cache. The speculative access creates a new cache line in the data cache which may include accessing R/W indicator of the cache line and a memory address stored in the tag section of the cache line. The newly created cache line may serve two purposes. First, it may allow the conflict detection logic using cache coherency protocol to detect if there is any conflicting locks or transactions have been created since the non-speculative access. If there is one, the execution unit of processing core 102 may abort the present transaction. However, since the time window for creating conflicts since the non-speculative access is very small, the number of transaction abortion is greatly reduced, and the success rate of transaction commitment increases. Second, the newly created cache line for the present transaction may warn later task about the usage of the memory section by the present transaction. If the cache line created for the present transaction does not cause any conflicts, at 310, the processing logic may facilitate the execution of instructions in the transaction using the HTM system as if the set of instructions in the transaction are executed in a single and indivisible operation.

Figure 4:
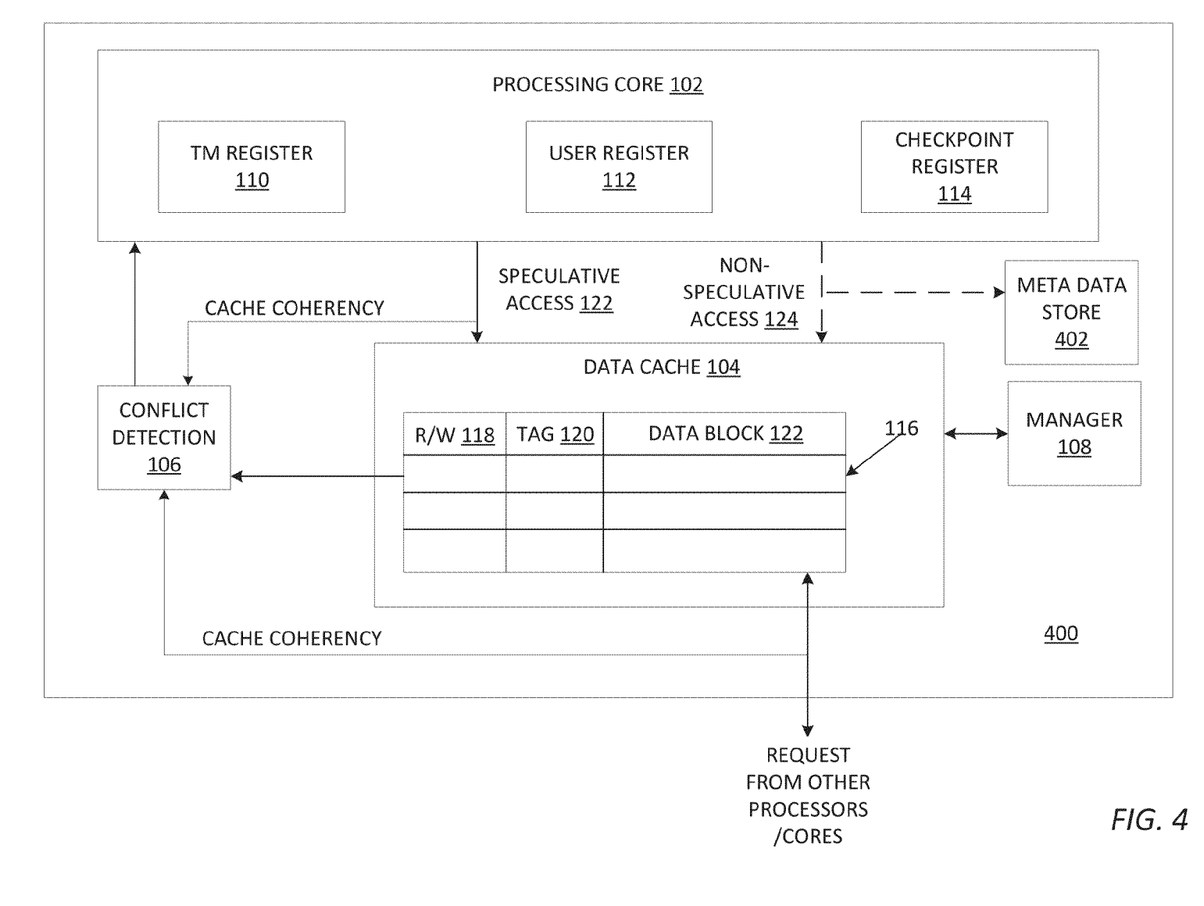
FIG. 4 illustrates circuit blocks implementing a hardware transactional memory system on a processing device according to another implementation of the disclosure.

Because the non-speculative access instruction 124 does not cause a transaction to abort even in the event of the detection of a conflict or roll back check points, the non-speculative access instruction 124 may be used to maintain meta data about locks that prevent the transaction from execution. In this way, the information stored in the meta data may help the transaction acquire access to the needed section of the memory. FIG. 4 illustrates circuit blocks implementing a hardware transactional memory system on a processing device 400 according to another implementation of the disclosure. Compared to the processing device 100 as shown in FIG. 2, processing device 400 additionally includes a meta data store 402 stored thereon meta data about locks in the cache lines 116 of data cache 104. Meta data store 402 may be part of L2 or L3 cache, or even part of the memory that is accessible by non-speculative access instruction 124. In one implementation, an execution unit of processing core 102 may read from and/or write in meta data store 402 by non-speculative access instruction 124 which does not change contents stored in cache lines 116 or checkpoint register 114 or create conflict detection at conflict detection logic 106.

In one implementation, meta data store 402 may store which cache line 116 (or which lock) that a transaction is waiting for. This information may be useful for a transaction that is in spin-wait waiting for a particular lock to be released. Thus, the meta data read by a non-speculative read operation may increase the likelihood of the transaction to commit. In the event that the transaction is aborted, this information may help restart the transaction more efficiently because the transaction may come back to wait for the same lock. In one implementation, the meta data store may further store which locks are acquired or released identified either by the memory addresses or by locations of tags 120 in cache lines 116. In one implementation, the meta data store 402 may store identifications of hardware (such as IDs of CPUs, processing cores) and/or software threads that acquire/release locks. The identifications may be process ID used by an operating system of the processing device 400. In one implementation, the meta data store 402 may store execution of instructions that led to locks being acquired/released. The execution may be represented by a current instruction pointer or alternatively, all or a subset of the function calls in the current execution of the instructions that lead to the lock acquisition/release. Function calls may be identified in the meta data store 402 by calls' stack frames, the cache addresses of the functions, and data contained in or referenced by parameters passed into the functions in each call of the functions. In one implementation, the meta data store 402 may store time stamps from a real-world clock or a logic clock. The meta data store 402 may store how long a transaction has been waiting for the release of a lock. If the wait is longer than a limit, the transaction may be aborted instead of wait through spin-wait. This may help avoid deadlock situations.

A non-speculative read and write may be used to update meta data stored in meta data store 402 either before or after a transaction execution. Before the transaction execution or the creation of a cache line in the data cache for the transaction, meta data store 402 may store which section of the main memory the transaction intends to access. After the transaction execution or the creation of a cache line in the data cache for the transaction, meta data store 402 may store what happened to cache lines.

Figure 5:
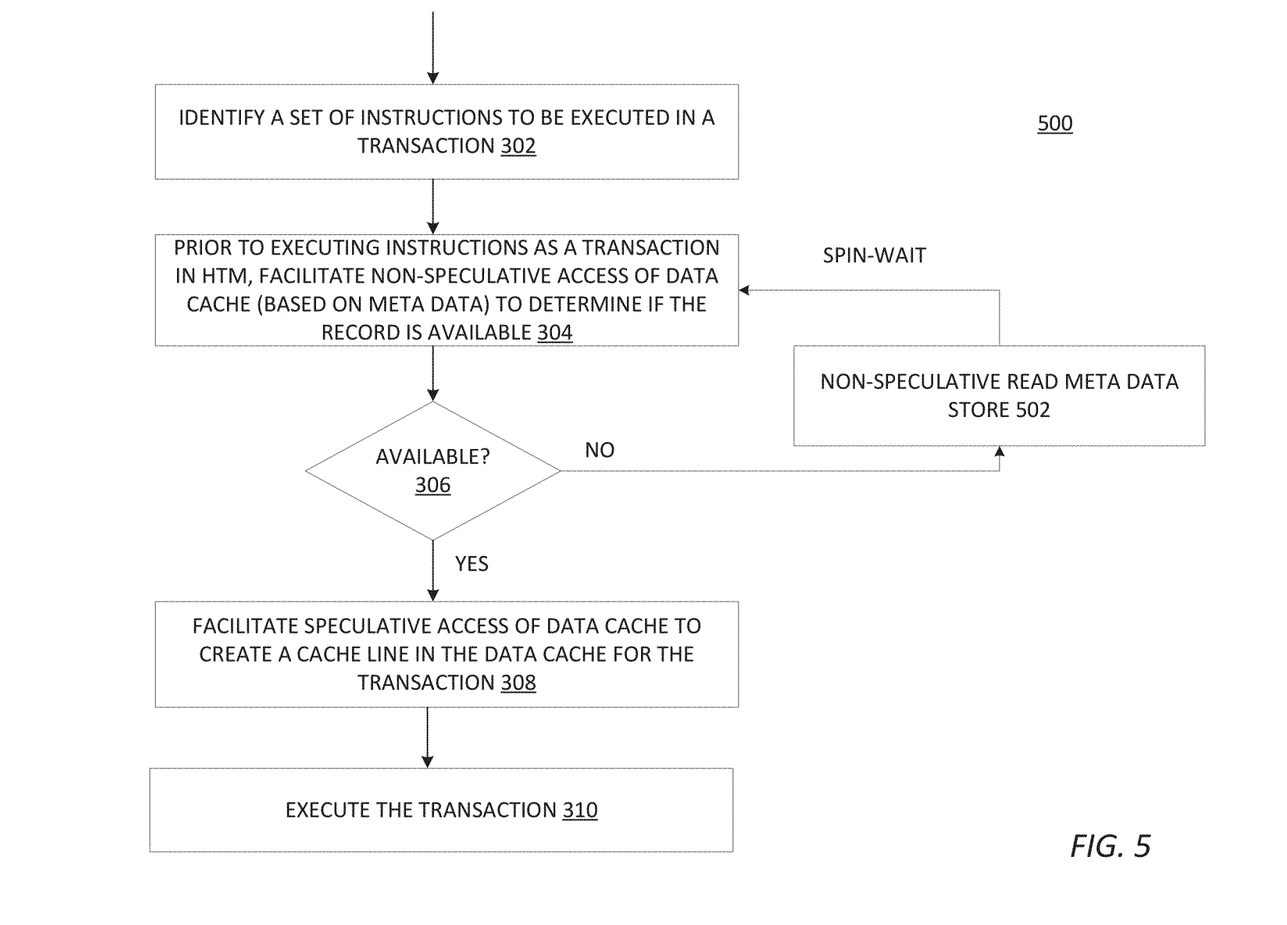
FIG. 5 shows a flow diagram illustrating a method for using non-speculative access to a meta data store according to implementations of the disclosure.

The meta data stored in meta data store 402 may be used to improve the performance of the HTM system. FIG. 5 shows a flow diagram illustrating a method 500 for using non-speculative access to a meta data store 402 according to implementations of the disclosure. Method 500 may be performed by a processing logic that may include hardware (e.g., circuitry, dedicated logic, programmable logic, microcode, etc.), software (e.g., instructions run on a processing device to perform hardware simulation), or a combination thereof. In one example, method 500 may be performed by a scheduler of an operating system running on processing core 102 as shown in FIG. 4.

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Referring to FIG. 5, method 500 may include operations 302-310 that are similar to those as shown in FIG. 3 except for that after, at 306, it is determined that the section of the memory is not available for the present transaction, the processing logic may issue a non-speculative read instruction to read meta data stored in meta data store 402. In view of the meta data, at 304, the processing logic may facilitate a non-speculative access to data cache to determine if the section of main memory is available for access. The meta data may provide guidance to the non-speculative access. For example, if meta data includes information relating to which lock the transaction is waiting for, the non-speculative access of data cache may be targeted to a particular cache line that contains the lock being waited for. Also, wait time stored in meta data store may be used to break a long wait that may be caused by a deadlock.

The processing logic may store certain information in the meta data store 402 conditioned on meta data that is already stored in the meta data store 402. For example, if the last lock acquired and being tracked is the lock protecting the root node of a tree (or list) data structure, the processing logic may choose not to store (or store only minimum) subsequent lock acquisitions and releases until the root lock is released.

Figure 6:
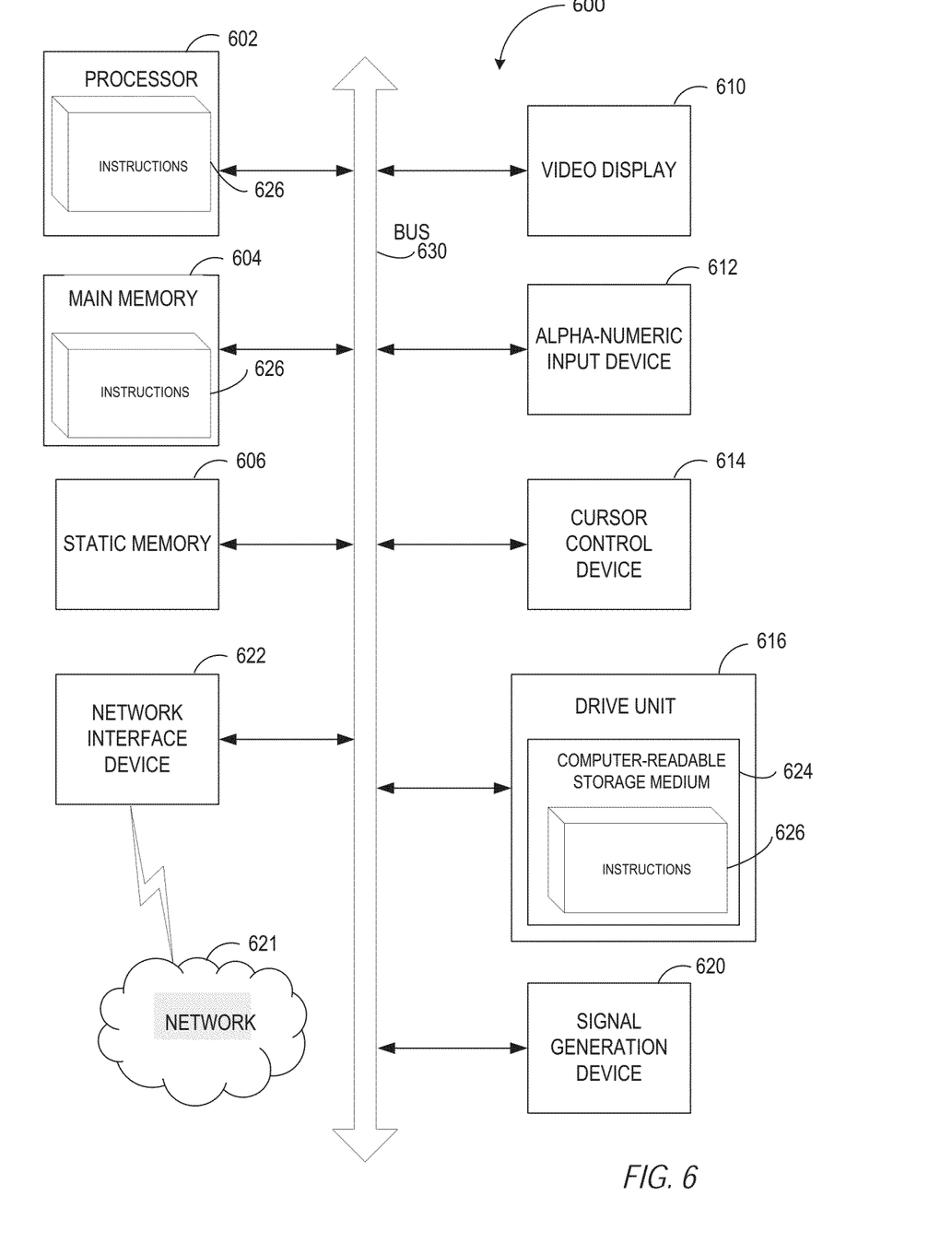
FIG. 6 shows a diagrammatic representation of a machine in the form of a computer system, in accordance with one example.

FIG. 6 depicts a diagrammatic representation of a machine in the form of a computer system 600 within which a set of memory instructions 626, for causing the machine to perform any one or more of the methodologies discussed herein, may be executed. In alternative examples, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers)

that individually or jointly execute a set (or multiple sets) of instructions to perform any one or more of the methodologies discussed herein.

The computer system 600 includes a processor 602 (e.g., a processing device), a main memory 604 (e.g., read-only memory (ROM), flash memory, dynamic random access memory (DRAM) such as synchronous DRAM (SDRAM), etc.), a static memory 606 (e.g., flash memory, static random access memory (SRAM), etc.), and a secondary memory 616 (e.g., a data storage device), which communicate with each other via a bus 630.

The processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processor 602 may also be one or more special-purpose processing devices such as an application specific integrated circuit (ASIC), a field programmable gate array (FPGA), a digital signal processor (DSP), network processor, or the like.

The computer system 600 may further include a network interface device 622. The network interface device may be in communication with a network 621. The computer system 600 also may include a video display unit 610 (e.g., a liquid crystal display (LCD), a touch screen, or a cathode ray tube (CRT)), an alphanumeric input device 612 (e.g., a keyboard), a cursor control device 614 (e.g., a mouse), and a signal generation device 620 (e.g., a speaker).

The secondary memory 616 may include a computer-readable storage medium (or more specifically a non-transitory computer-readable storage medium) 624 on which is stored one or more sets of instructions 626 for the computer system 100 representing any one or more of the methodologies or functions described herein. The instructions 626 for the computer system 100 may also reside, completely or at least partially, within the main memory 604 and/or within the processor 602 during execution thereof by the computer system 600, the main memory 604 and the processing device 602 also constituting computer-readable storage media. The instructions 626 for the computer system 100 may further be transmitted or received over a network via the network interface device 622.

While the computer-readable storage medium 624 is shown in an example to be a single medium, the term "computer-readable storage medium" should be taken to include a single medium or multiple media (e.g., a centralized or distributed database, and/or associated caches and servers) that store the one or more sets of instructions 626. The term "computer-readable storage medium" shall also be taken to include any medium that is capable of storing or encoding a set of instructions for execution by the machine that cause the machine to perform any one or more of the methodologies of the disclosure. The term "computer-readable storage medium" shall accordingly be taken to include, but not be limited to, solid-state memories, and optical and magnetic media.

Some portions of the detailed descriptions above are presented in terms of symbolic representations of operations on data bits within a computer memory. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "configuring," "associating," "executing," "adjusting," "sending," "receiving," "determining," "transmitting," "identifying," "specifying," "granting," "accessing," "assigning," "detecting," and "requesting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The descriptions and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the disclosure is not described with reference to any particular programming language. It will be appreciated that a variety of programming languages may be used to implement the teachings of the disclosure as described herein.

It is to be understood that the above description is intended to be illustrative, and not restrictive. Many other examples will be apparent to those of skill in the art upon reading and understanding the above description. Although the disclosure has been described with reference to specific examples, it will be recognized that the disclosure is not limited to the examples described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A method comprising:
   identifying, by a processing device executing a scheduler of an operating system, a set of instructions to be executed as a transaction that is to access a section of memory;
   prior to executing the set of instructions as the transaction, facilitating a non-speculative access to a data cache coupled to the processing device, the data cache comprising a plurality of cache lines, each cache line comprising a lock to lock a respective portion of the memory;
determining if the section of memory is available for the transaction in view of locks of the plurality of cache lines; and
in response to a determination that the section of memory is not available, causing the non-speculative access to the data cache to be repeated.

2. The method of claim 1, further comprising:
in response to a determination that the section of memory is available, facilitating a speculative access of the data cache to create a cache line in the data cache for the transaction, the cache line comprising an address to the section of memory;
determining if the address in the created cache line conflicts with locks in other cache lines of the data cache; and
in response to a determination that there is no conflict for the address in the created cache line, executing the transaction using a hardware transactional memory system.

3. The method of claim 2, further comprising:
in response to a determination that there is a conflict for the address in the created cache line, aborting the transaction using the hardware transaction memory system.

4. The method of claim 3, further comprising:
in response to aborting the transaction, restoring at least one register in the processing device to a checkpoint prior to the execution of the transaction.

5. The method of claim 2, wherein the hardware transactional memory system comprises a conflict detection logic that is to detect a conflict in view of cache coherency protocol.

6. The method of claim 1, further comprising:
in response to a determination that the section of memory is not available, facilitating a non-speculative read of meta data stored in a storage; and
causing the non-speculative access to the data cache to be repeated in view of the meta data.

7. The method of claim 6, wherein the meta data comprises data indicating which lock stored in the data cache constitutes a conflict for the transaction or how long the transaction has been waiting for execution.

8. The method of claim 1, wherein the non-speculative access to the data cache does not cause creation of a cache line in the data cache.

9. The method of claim 1, wherein the data cache is shared by a plurality of processing cores of the processing device.

10. An apparatus comprising:
a memory;
a data cache communicably coupled to the memory, the data cache comprising a plurality of cache lines, each cache line comprising a lock to lock a respective portion of the memory; and
a processing device communicably coupled to the memory and to the data cache and to:
identify a set of instructions to be executed as a transaction that is to access a section of the memory;
prior to executing the set of instructions as the transaction, perform a non-speculative access to the data cache;
determine if the section of the memory is available for the transaction in view of locks stored in the plurality of cache lines; and
in response to a determination that the section of memory is not available, cause the non-speculative access to the data cache to be repeated.

11. The apparatus of claim 10, wherein the processing device is further to:
in response to a determination that the section of the memory is available, perform a speculative access of the data cache to create a cache line in the data cache for the transaction, the cache line comprising an address to the section of memory;
determine if the address in the created cache line conflicts with locks in other cache lines of the data cache; and
in response to a determination that there is no conflict for the address in the created cache line, execute the transaction using a hardware transactional memory system.

12. The apparatus of claim 11, wherein the processing device is further to
in response to a determination that there is a conflict for the address in the created cache line, abort the transaction using the hardware transaction memory system.

13. The apparatus of claim 12, wherein the processing device is further to
in response to aborting the transaction, restore at least one register in the processing device to a checkpoint prior to the execution of the transaction.

14. The apparatus of claim 10, further comprising a conflict detection logic coupled to the data cache,
wherein the conflict detection logic is to detect a conflict in view of cache coherency protocol.

15. The apparatus of claim 10, further comprising a storage communicably coupled to the processing device,
wherein the processing device is further to in response to a determination that the section of the memory is not available, perform a non-speculative read of meta data stored in the storage;
again perform the non-speculative access to the data cache in view of the meta data.

16. The apparatus of claim 15, wherein the meta data comprise data indicating at least one of which lock stored in the data cache constitutes a conflict for the transaction or how long the transaction has been waiting for execution.

17. The apparatus of claim 16, wherein the non-speculative access to the data cache does not cause creation of a cache line in the data cache.

18. A non-transitory computer readable storage medium comprising instructions that, when executed by a processing device, cause the processing device to:
identify, by the processing device, a set of instructions to be executed as a transaction that is to access a section of memory;
prior to executing the set of instructions as the transaction, facilitate a non-speculative access to a data cache coupled to the processing device, the data cache comprising a plurality of cache lines, each cache line comprising a lock to lock a respective portion of the memory;
determine if the section of memory is available for the transaction in view of locks stored in the plurality of cache lines; and
in response to a determination that the section of memory is not available, cause the non-speculative access to the data cache to be repeated.

19. The non-transitory computer readable storage medium of claim 18, wherein the processing device is further to:
in response to a determination that the section of memory is available, facilitate a speculative access to the data cache to create a cache line in the data cache for the transaction, the cache line comprising an address to the section of memory;
determine if the address in the created cache line conflicts with locks in other cache lines of the data cache; and in response to a determination that there is no conflict for the address in the created cache line, cause the transaction to be executed using a hardware transactional memory system.

20. The non-transitory computer readable storage medium of claim 19, wherein the processing device is further to:
in response to a determination that there is a conflict for the address in the created cache line, cause the transaction to be aborted using the hardware transaction memory system.

* * * * *